United States Patent [19]
Blaisdell

[11] Patent Number: 5,669,204
[45] Date of Patent: Sep. 23, 1997

[54] BAG FOLDING SYSTEM

[75] Inventor: Kenneth C. Blaisdell, Phoenix, Ariz.

[73] Assignee: Automated Solutions, Inc., Phoenix, Ariz.

[21] Appl. No.: 529,688

[22] Filed: Sep. 18, 1995

[51] Int. Cl.⁶ .................................................. B65B 63/04
[52] U.S. Cl. .......................... 53/429; 53/116; 53/117; 53/438; 53/529; 493/243; 493/251; 493/405; 493/451; 493/458
[58] Field of Search .......................... 53/116, 117, 429, 53/438, 529; 280/728.1, 731, 732, 743.1; 493/243, 244, 250, 251, 405, 409, 421, 451, 456, 457, 458

[56] References Cited

U.S. PATENT DOCUMENTS

| | | | |
|---|---|---|---|
| 3,839,947 | 10/1974 | Komas et al. | 493/244 |
| 3,839,948 | 10/1974 | Putti et al. | 493/244 |
| 3,918,699 | 11/1975 | Arbter | 493/405 |
| 3,919,827 | 11/1975 | Larson et al. | 493/451 X |
| 4,840,013 | 6/1989 | Perrella | 53/429 |
| 5,162,035 | 11/1992 | Baker | 493/244 X |
| 5,163,893 | 11/1992 | Hara et al. | 493/451 X |
| 5,300,011 | 4/1994 | Budde et al. | 493/405 |
| 5,360,387 | 11/1994 | Baker | 493/405 |
| 5,375,393 | 12/1994 | Baker et al. | 53/429 |
| 5,391,137 | 2/1995 | Depoy et al. | 493/405 |
| 5,456,651 | 10/1995 | Baker et al. | 493/243 X |
| 5,471,817 | 12/1995 | Baker et al. | 53/429 |
| 5,493,846 | 2/1996 | Baker et al. | 53/429 |

*Primary Examiner*—Daniel Moon
*Attorney, Agent, or Firm*—Parsons & Goltry; Robert A. Parsons; Michael W. Goltry

[57] ABSTRACT

A method of automatically folding an air bag having an end coupled to a retainer and an opposed distal end including flattening and narrowing the bag, providing first and second upright blade assemblies each having individually movable blades between a normal position and an interdigitated position. The bag is positioned between the blade assemblies with the retainer held and the distal end allowed to gradually move toward the retainer. Undulating folds are formed in the bag between the retainer and the distal end by moving a blade of the first assembly into a raised position, moving a blade of the second assembly into a lowered position, and alternately and individually moving each remaining blade into a raised and lowered positions, respectively, while allowing the distal end of the bag to gradually move toward the retainer as each undulating fold is formed.

18 Claims, 4 Drawing Sheets

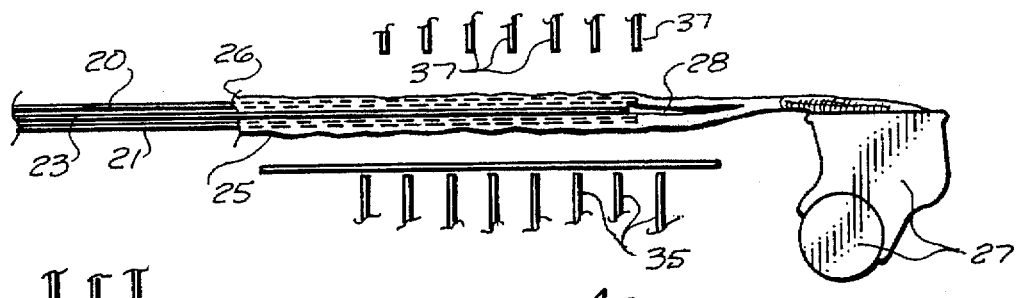
FIG. 4
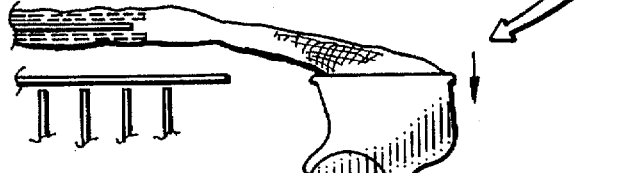
FIG. 5
FIG. 6
FIG. 7
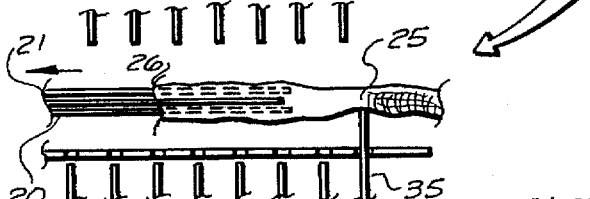
FIG. 8
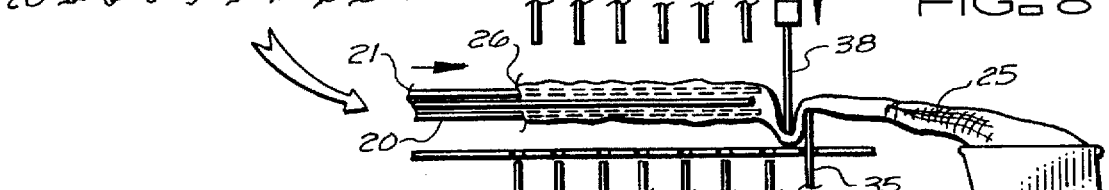
FIG. 9
FIG. 10

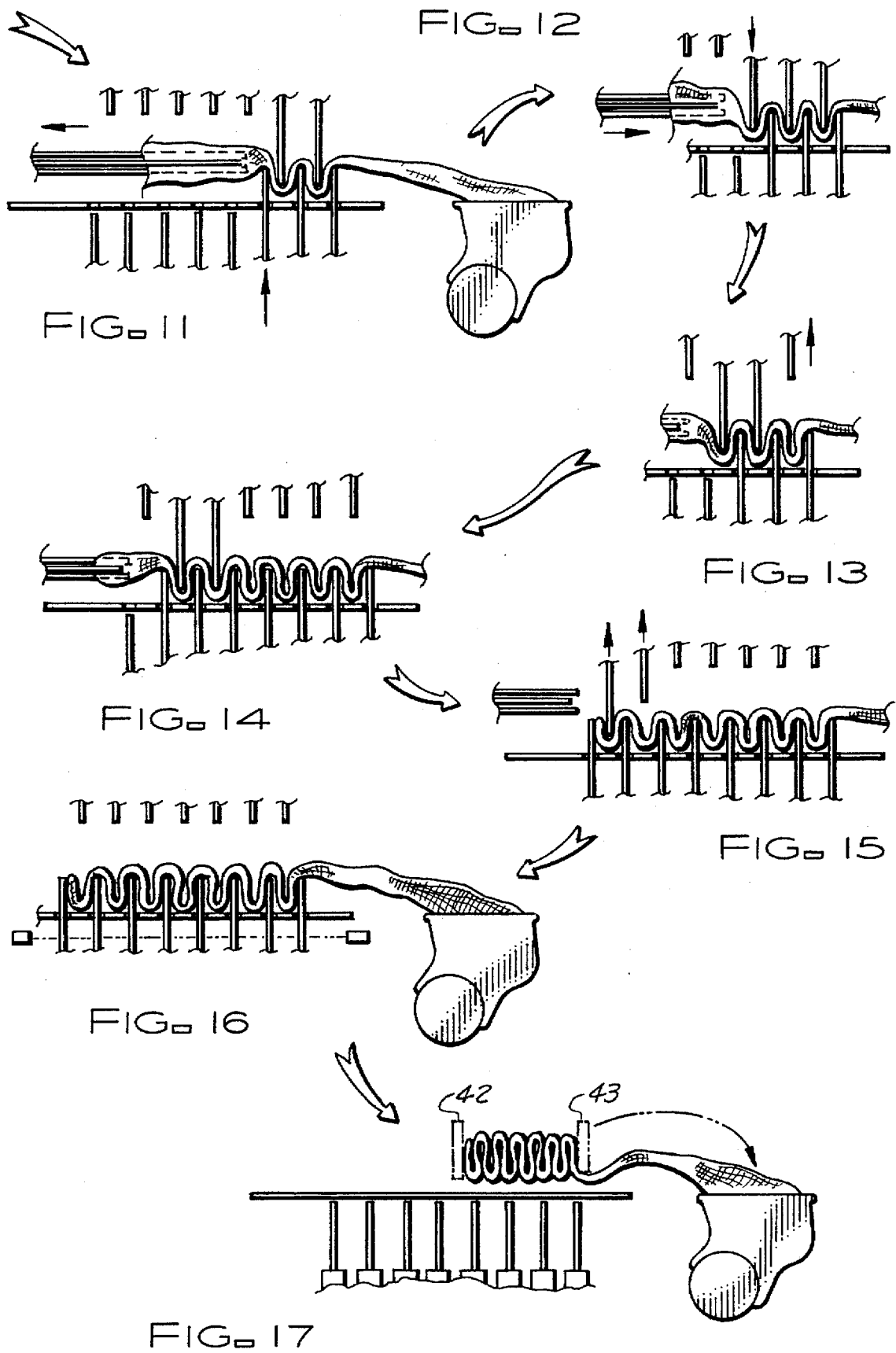

BAG FOLDING SYSTEM

BACKGROUND OF THE INVENTION

1. Field of the Invention

This invention relates to the folding of flexible, multilayer, sheet-like articles, such as bags.

More particularly, the present invention relates to folding vehicular air bags.

In a further and more specific aspect, the instant invention concerns a method and apparatus for improved automated folding of vehicular air bags.

2. Prior Art

Vehicular air bags are among the latest safety enhancements for automobiles and other vehicles. Their use in vehicles is increasing dramatically. Generally, such air bags are located within a steering wheel or column, dashboard, control panel, side door, or other out of the way location which is near a vehicle's occupant. Sensors located in the vehicle detect when a crash is occurring and activate the air bag(s). When activated, the air bags rapidly inflate between the vehicle's occupant and a potentially injurious or deadly surface, such as a steering wheel, dashboard, etc. As the crash progresses, the force of the crash may hurl the occupant toward the injurious or deadly surface, but the occupant first encounters the air bag, which prevents or otherwise lessens injury to the occupant.

In order for the air bag to be effective, it must be stored in an out-of-the-way location until needed. Moreover, it must be stored in such a manner that it can be rapidly activated to do its job. Due to the continual downsizing of vehicles, the out-of-the-way locations where air bags are typically located are usually rather small. Thus, an air bag must be folded into a small package so that it fits into a small location. But, the technique used to fold the air bag affects its deployment when activated. To minimize the possibility of harm to a vehicle occupant, the air bag preferably deploys evenly in a spreading out (side-to-side) manner rather than shooting first toward one side and then the other, or shooting straight out and then filling in from side to side.

Previously, the conventional process for folding vehicular air bags relied almost exclusively on manual labor. This conventional process was plagued with problems. For example, approximately 12 minutes were required to fold an air bag using manual labor. With the large number of air bags now being used in vehicles, a tremendous amount of labor and expense would be required to manually fold air bags. Moreover the folding of air bags requires a large number of repetitive motions. If done manually, such repetitive motions are potentially hazardous to the health of the manual laborers. In addition, such repetitive motions lead to boredom, which in turn leads to a poor performance of the job.

The manual folding of vehicular air bags is substantially obsolete by a bag folding system disclosed in U.S. Pat. No. 5,375,393, entitled "Bag Folding System" and invented and owned by the inventors of the subject invention. The bag folding system disclosed in the '393 patent is incorporated herein by reference, especially the compressing of the folded air bag and final packaging operations and steps. Some of the specific folding operations in the '393 patent, and especially the method and apparatus for forming undulating folds in the flattened bag, have a potential for allowing some unwanted movement of the bag, which can result in some of the bags not having optimal folds therein.

It would be highly advantageous, therefore, to remedy the foregoing and other deficiencies inherent in the prior art.

Accordingly, it is an object of the present invention to provide improvements in the process of folding air bags.

Another object of the present invention is to provide an improved air bag folding system.

And another object of the present invention is to provide an improved automated system for folding air bags.

Still another object of the present invention is to provide an air bag folding system which provides more uniform undulating folds in the flattened bag.

Yet another object of the present invention is to provide a system for more consistently folding air bags to achieve a desirable deployment pattern and a consistently small folded bag profile.

SUMMARY OF THE INVENTION

Briefly, to achieve the desired objects of the instant invention, in accordance with a preferred embodiment thereof, a method of and apparatus for automatically folding an air bag having an end coupled to a retainer and an opposed distal end is disclosed. First and second upright blade assemblies each having individually movable blades, movable between a normal position and an interdigitated position are provided. The method includes flattening and narrowing the bag and positioning it between the blade assemblies with the retainer held, and the distal end held but allowed to gradually move toward the retainer. Undulating folds are formed in the bag between the retainer and the distal end by moving a blade of the first assembly into a raised position, moving a blade of the second assembly into a lowered position, and alternately and individually moving each remaining blade into a raised and lowered positions, respectively, while allowing the distal end of the bag to gradually move toward the retainer as each undulating fold is formed.

The blades in the second assembly are removed as the undulating folds are formed, with at least two blades remaining in the lowered position during the operation. The undulating folds are then held between a pair of compression arms while the blades in the first assembly are lowered and the compression arms are then activated to compress the undulating folds and place the compressed bag in the retainer.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIGS. 4 through 17 are side views of a portion of the bag folding system of FIG. 2, sequentially illustrating various steps in the novel method of forming undulating folds in the air bag.

DETAILED DESCRIPTION OF THE PREFERRED EMBODIMENTS

Figure 1:
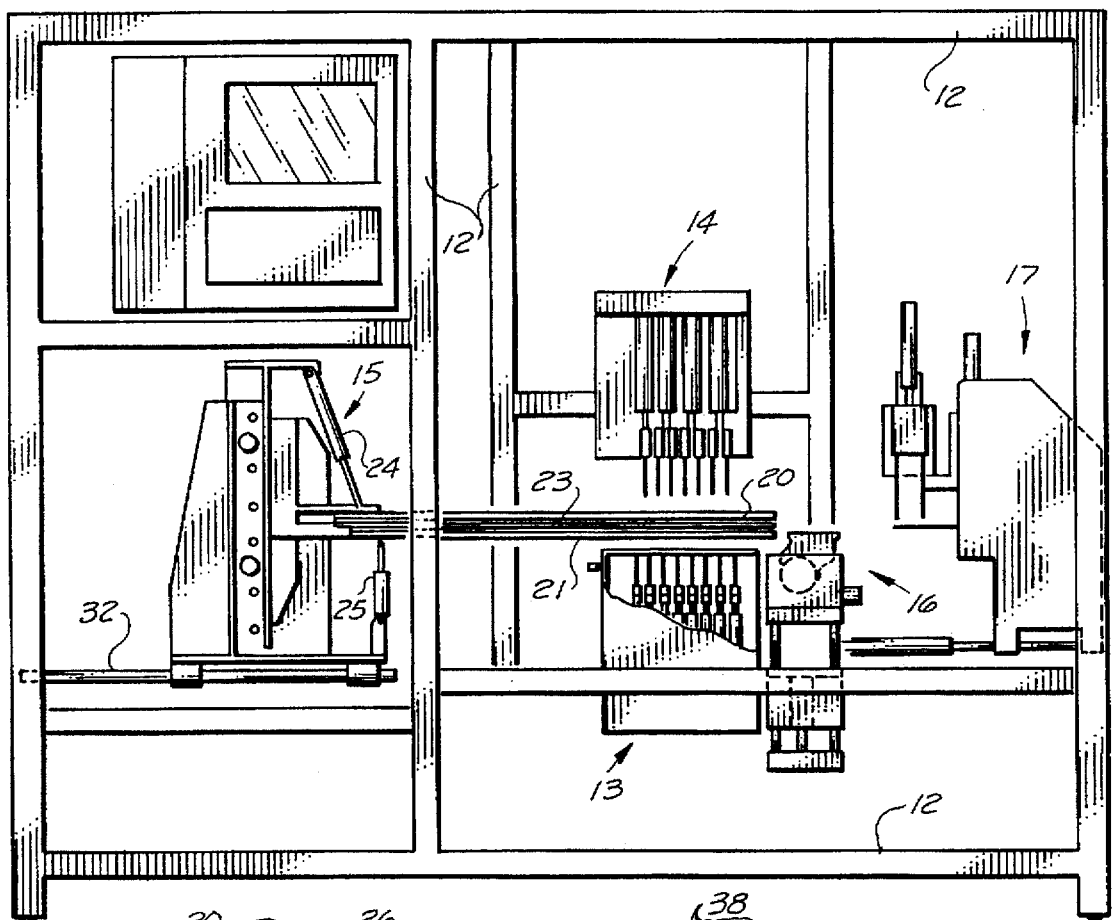
FIG. 1 is a side view of a bag folding system, constructed in accordance with the teachings of the instant invention, as it would appear prior to a first stage in the process for folding an air bag.
Figure 2:
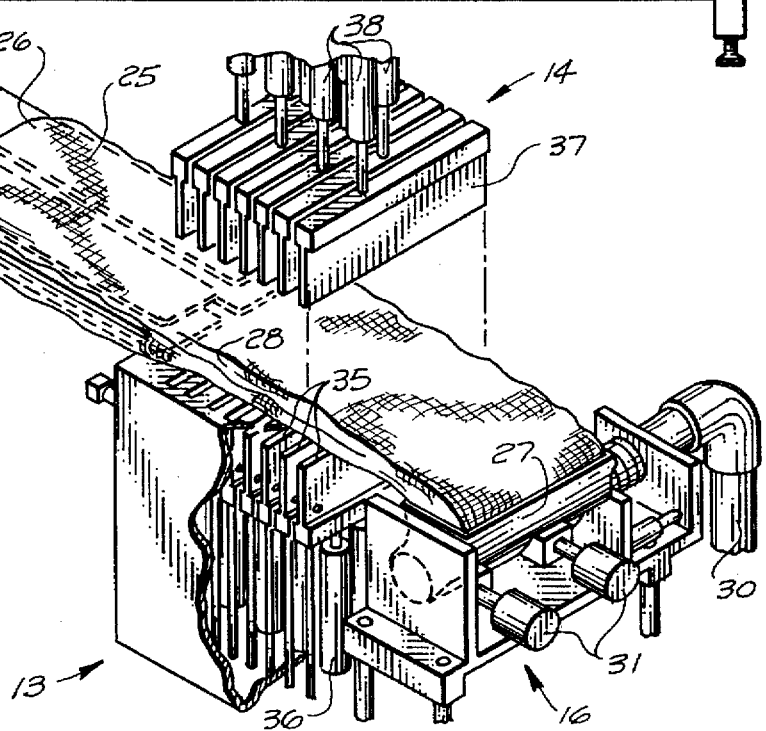
FIG. 2 is a perspective view of a portion of the bag folding system of FIG. 1, with an air bag in place, as it would appear after horizontal folding, flattening and forming side pleats in the air bag.

Turning now to the drawings in which like reference characters indicate corresponding elements throughout the several views, attention is first directed to FIG. 1 which illustrates an automatic bag folding machine generally designated by the reference character 10. Bag folding machine 10 consists of a frame 12 supporting a lower accordion fold assembly 13, an upper accordion fold assembly 14, a flattening and pleat forming assembly 15, a retainer holding assembly 16, and an inserter assembly 17. Referring to FIGS. 1 and 2, assembly 16 includes an upper pair of elongated, parallel pleat holding arms 20 and a lower pair of elongated, parallel pleat holding arms 21 spaced vertically a short distance below upper pleat holding arms 20 and parallel therewith. A first pressure arm 23 is pivotally mounted adjacent one end and has a pheumatic cylinder 24 attached thereto for pivoting arm 23 about the one end from a position between pleat holding arms 20 and 21 to a position at an acute angle thereto (not shown). It should be understood that while pneumatic cylinders are use in this and subsequent elements, many other types of motors may be employed to provide reciprocating movement such as hydraulic cylinders, electric motors, etc. Similarly, a second pressure arm (not shown) is pivotally mounted adjacent one end and has a pneumatic cylinder 25 attached thereto for pivoting the second pressure arm about the one end from a position between pleat holding arms 20 and 21 to a position at an acute angle thereto.

In the operation of flattening and pleat forming assembly 15, first and second arms 23 are pivoted outwardly at an acute angle. An air bag 25 is provided having a distal end 26 and a retainer 27 fixedly attached thereto at an opposite end. Pleats 28 are formed in the sides of air bag 25 so as to extend from distal end 26 to adjacent retainer 27. Some additional information as to the shape of air bag 25 before and after forming pleats 28 is disclosed in the '393 Patent cited above. Elongated pleat holding arms 20 and 21 are positioned in pleats 28 to retain pleats 28 in bag 25 and to hold bag 25 flat during the following operations. First and second arms 23 are then pivoted inward into a position between pleat holding arms 20 and 21 to hold bag 25 firmly on pleat holding arms 20 and 21 for reasons that will become apparent presently. Depending upon the size of air bag 25 and the relative size of retainer 27, first and second arms 23 and each pair of pleat holding arms 20 and pleat holding arms 21 may be mounted for lateral outward movement to flatten air bag 25, and/or for vertical movement together to hold air bag 25 firmly in a flattened and pleated position.

With air bag 25 firmly held between pleat holding arms 20 and 21 and pressure arms 23, retainer 27 is fixedly clamped in retainer holding assembly 16. Generally, retainer 27 is positioned in assembly 16 with an air inlet/outlet port (not shown) in communication with a light vacuum nozzle 30. Retainer 27 is then clamped in this position by means of one or more clamps 31 and flattening and pleat forming assembly 15, which is mounted for horizontal movement on rails 32, is positioned a short distance away from assembly 16 to tighten air bag 25. Also, a light vacuum is drawn on air bag 25, through retainer 27, by means of vacuum nozzle 30 to ensure the flatness of air bag 25. With air bag 25 in the position described, and illustrated in FIG. 2, lower accordion fold assembly 13 and upper accordion fold assembly 14 are spaced apart vertically on either side of air bag 25.

One skilled in the art will understand that the pleat folding steps of the bag folding process are not new, and any method may be employed, such as by hand or using conventional side pleat blades known in the art. In these instances, the side pleat blades would function to hold air bag 25 as the pleat holding arms 20, pleat holding arms 21 and first and seconds arms 23.

Lower accordion fold assembly 13 includes a plurality of upright blades 35 individually movable between a normal lowered position (illustrated in FIG. 2) and a raised position by means of individual pneumatic cylinders 36 attached to each blade 35. Similarly, upper accordion fold assembly 14 includes a plurality of upright blades 37 spaced vertically above blades 35 and individually movable between a normal raised position and a lowered position by means of individual pneumatic cylinders 38 attached to each blade 37. Blades 35 and 37 are further positioned so as to be interdigitated when blades 35 are in the raised position and blades 37 are in the lowered position. That is to say, blades 35 and 37 are substantially evenly spaced and alternating so that each blade 35 (except the end blades) is between a pair of blades 37 and each blade 37 is between a pair of blades 35. While not specifically illustrated, blades 35 and 37 can be adjusted to increase or decrease the spacing therebetween. This increases the flexibility of the apparatus, allowing for tighter or looser folds, as well as allowing for different bag materials having different thicknesses.

Figure 3:
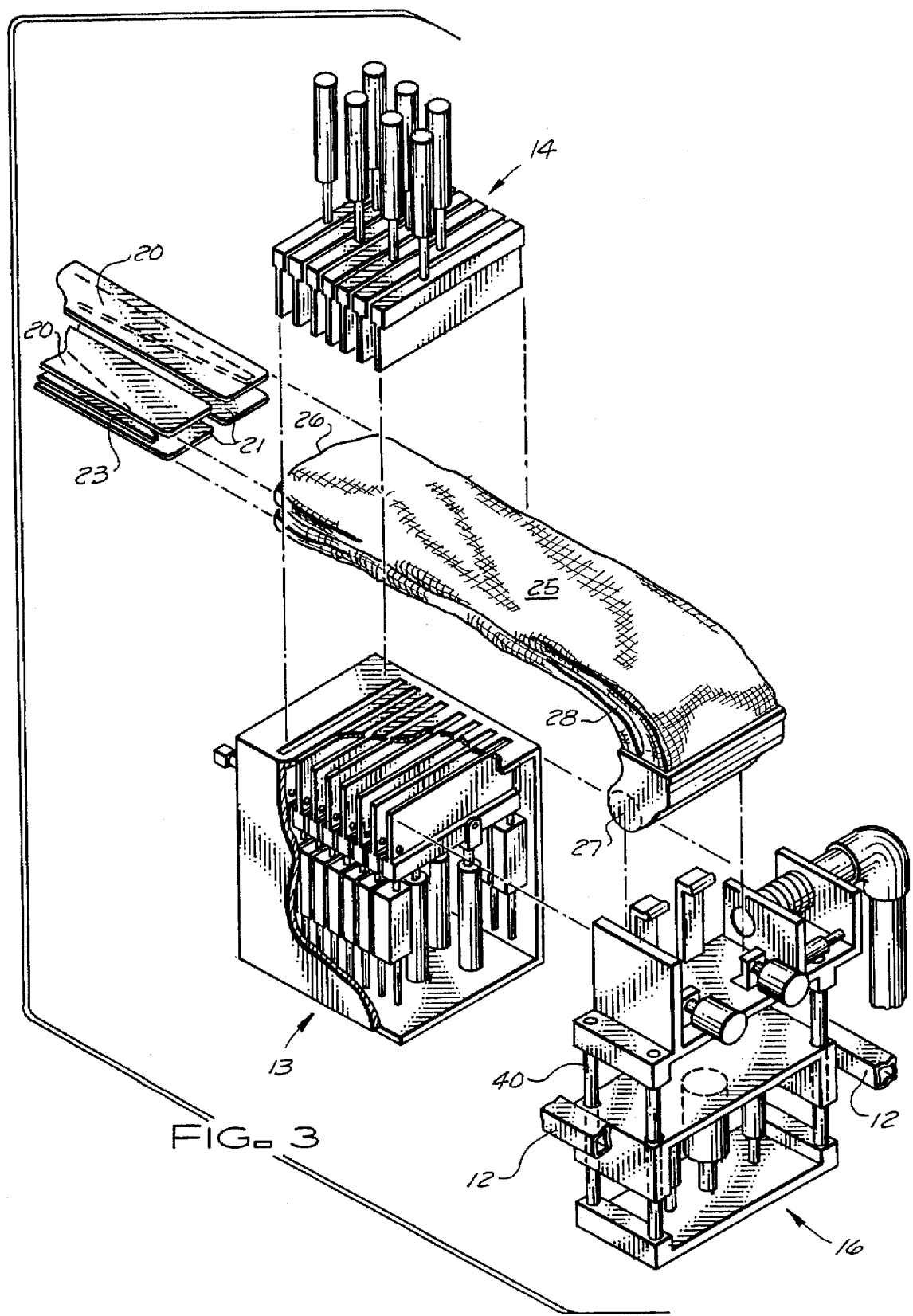
FIG. 3 is an exploded perspective view of the portion of the bag folding system of FIG. 2, illustrating the various components in more detail.

With automatic bag folding machine 10 and air bag 25 in the positions illustrated in FIG. 2, the process of forming undulating folds in air bag 25 between retainer 27 and distal end 26 proceeds as follows and as illustrated in FIGS. 4–17. For simplicity of understanding, FIGS. 4–17 illustrate the operation of automatic bag folding machine 10 in a very simplified form, showing only the tips of blades 35 and 37 and pleat holding arms 20 and 21. Referring specifically to FIGS. 4 and 5, retainer holding assembly 16, which is mounted on vertical rails 40 (see FIGS. 1–3) for vertical movements, is lowered slightly to properly position bag 25 and retainer 27 relative to lower accordion fold assembly 13.

Referring to FIG. 6, a first blade 37 of lower accordion fold assembly 13 is moved from the normal lowered position into the raised position. Pleat holding arms 20 and 21 are withdrawn slightly from pleats 28 of air bag 25, as illustrated in FIG. 7. Next, a blade 37 of upper accordion fold assembly 14 is moved from the normal raised position into a lowered position, as illustrated in FIG. 8. Approximately at the same time as the movement of the first of blades 37 from the upper to the lower position, pleat holding arms 20 and 21 move a short distance back toward retainer 27. This process is continued by alternately and individually moving each of the remaining blades in the lower and upper accordion fold assemblies 13 and 14 into the raised and lowered positions, respectively, until all of the blades have been moved, (see specifically FIGS. 9–15. During this process, actuating means including pneumatic cylinders 36, 38 and cylinders (not shown) associated with flattening and pleat forming assembly 15, are operated to allow the distal end of air bag 25 to gradually move along the elongated pleat holding arms toward the retainer and to gradually withdraw elongated pleat holding arms 20 and 21 from between accordion fold assemblies 13 and 14 as each undulating fold is formed.

The continuous, generally oscillating movement of flattening and pleat forming assembly 15 serves several major purposes. First, by retaining pleats 28 in air bag 25 and retaining air bag 25 flat, the process of forming undulating folds is facilitated and the folds are formed more uniformly. Second, by holding distal end 26 of air bag 25 extended, the undulating, or accordion, folds are formed more uniformly and tighter, so that the final package is very small. Also, by reversing the movement of flattening and pleat forming assembly 15 while upper blades 37 are moving into the lower position, the accordion fold is formed with less strain on air bag 25, thereby providing less chance of damage, and there is less resistance to the movement of the blades (both 35 and 37) so that the entire automatic bag folding machine 10 operates smoother, easier and with less power required.

Referring to FIGS. 13–15, it should be noted that as at least three upper blades 37 are moved into the lower position the first blade to move is returned to the upper or normal position. Thus, the preferred method includes sequentially moving each individual blade 37, which was previously moved to the lowered position, back into the raised position so that no less than two blades 37 are in the lowered position at a time. As illustrated in FIG. 16, this results in a very efficient automatic bag folding machine 10 in which all of blades 37 are already moved out of the way as the process of forming undulating folds is completed. It will of course be understood that different numbers of blades 37 in different orders could be moved if desired, or all of blades 37 could be raised at one time if that is determined to be convenient. The sequence of raising blades is highly adjustable, permitting each machine to be adjusted to best accommodate bag constructed of different materials having different resiliency and thickness.

With the process of forming undulating folds in bag 25 completed and blades 37 moved into the raised or normal position, as illustrated in FIG. 16, a pair of compression arms 42 and 43 are brought into engagement with bag 25, as illustrated in FIG. 17, so as to be on opposite sides of the accordion folds and to hold the accordion folds together. Compression arms 42 and 43 are a part of inserter assembly 17, and are explained in more detail in the '393 Patent cited above. The accordion folds of bag 25 are then compressed with compression arms 42 and 43 and inserted into retainer 27.

Accordingly, an improved process of folding air bags is disclosed wherein the air bags are held and moved during the folding process to facilitate the process and to reduce strain on the bag. Also, an improved automatic air bag folding machine is disclosed to perform the improved folding process. Further, the improved process results in more uniform undulating folds in the flattened bag and more uniform and smaller folded air bags. The improved process and system for more consistently folding air bags achieves a more desirable deployment pattern and a consistently small folded bag profile.

The foregoing is given by way of example only. Other modifications and variations may be made by those skilled in the art without departing from the scope of the invention as defined by the following claims.

Having fully described and disclosed the present invention and preferred embodiments thereof in such clear and concise terms as to enable those skilled in the art to understand and practice same, the invention claimed is:

1. A method of automatically folding an air bag having an end coupled to a retainer and an opposed distal end, said method comprising the steps of:

flattening and narrowing the bag;

providing a first plurality of upright blades individually movable between a normal lowered position and a raised position and a second plurality of upright blades spaced vertically above the first plurality and individually movable between a normal raised position and a lowered position, the first plurality and the second plurality being further positioned with the blades interdigitated in the raised and lowered positions, respectively;

fixing the retainer with the bag positioned between the first and second pluralities of blades and holding the bag adjacent the distal end while allowing the distal end to gradually move toward the retainer; and forming undulating folds in the bag between the retainer and the distal end by individually moving each blade of the first plurality of blades into the raised position and alternately and individually moving each blade of the second plurality of blades into the lowered position while allowing the distal end of the bag to gradually move toward the retainer as each undulating fold is formed.

2. A method as claimed in claim 1 wherein the step of flattening and narrowing the bag includes forming horizontal pleats extending from the distal end of the bag substantially to the retainer and holding the bag adjacent the distal end so as to retain the bag flat and to retain the horizontal pleats.

3. A method as claimed in claim 2 wherein the step of forming horizontal pleats extending from the distal end of the bag substantially to the retainer includes providing elongated pleat holding arms and using the pleat holding arms for retaining the bag flat and for retaining the pleats.

4. A method as claimed in claim 3 wherein the step of holding the bag adjacent the distal end includes holding the bag with the pleat holding arms extending from the distal end parallel with the pleats while gradually withdrawing the pleat holding arms from engagement with the bag toward the distal end.

5. A method as claimed in claim 1 wherein the step of forming undulating folds in the bag includes sequentially moving each individual blade of the second plurality of blades which was previously moved to the lowered position back into the raised position so that no less than two blades of the second plurality of blades are in the lowered position at a time.

6. A method as claimed in claim 5 including the steps of moving a final two blades of the second plurality of blades into the raised position, holding the undulating folds between a pair of compression arms, moving the first plurality of blades into the lowered position, compressing the undulating folds together, and inserting the compressed undulating folds into the retainer.

7. A method as claimed in claim 1 wherein the step of holding the bag adjacent the distal end during the step of forming undulating folds in the bag includes the steps of moving the distal end toward the retainer when each blade of the first plurality of blades is moved into the raised position and moving the distal end towards the retainer when each blade of the second plurality of blades is moved into the lowered position.

8. A method of automatically folding an air bag having an end coupled to a retainer; an opposed distal end and pleats formed therebetween, said method comprising the steps of:

providing elongated pleat holding arms positioned to receive the bag adjacent the distal end and extending from the distal end toward the retainer;

flattening and narrowing the bag and, using the elongated pleat holding arms, holding the bag with the elongated pleat holding arms extending from the distal end parallel with the pleats;

providing a first plurality of upright blades individually movable between a normal lowered position and a raised position and a second plurality of upright blades spaced vertically above the first plurality and individually movable between a normal raised position and a lowered position, the first plurality and the second plurality being further positioned with the blades interdigitated in the raised and lowered positions, respectively;

fixing the retainer with the bag positioned between the first and second pluralities of blades and holding the bag with the elongated pleat holding arms adjacent the distal end while allowing the distal end to gradually move toward the retainer; and forming undulating folds in the bag between the retainer and the distal end by moving a blade of the first plurality of blades into the raised position, moving a blade of the second plurality of blades into the lowered position, and alternately and individually moving each of remaining blades in the first and second pluralities into the raised and lowered positions, respectively, until all of the blades in the first and second pluralities have been moved, while allowing the distal end of the bag to gradually move between the elongated pleat holding arms toward the retainer as each undulating fold is formed.

9. A method as claimed in claim 8 wherein the step of holding the bag adjacent the distal end includes holding the bag with the elongated pleat holding arms extending from the distal end parallel with the pleats while gradually withdrawing the elongated pleat holding arms from engagement with the bag, toward the distal end.

10. A method as claimed in claim 8 wherein the step of forming undulating folds in the bag includes sequentially moving each individual blade of the second plurality of blades which was previously moved to the lowered position back into the raised position so that no less than two blades of the second plurality of blades are in the lowered position at a time.

11. A method as claimed in claim 10 including the steps of moving a final two blades of the second plurality of blades into the raised position, holding the undulating folds between a pair of compression arms, moving the first plurality of blades into the lowered position, compressing the undulating folds together, and inserting the compressed undulating folds into the retainer.

12. A method as claimed in claim 8 wherein the step of holding the bag during the step of forming undulating folds in the bag includes the steps of moving the distal end toward the retainer when each blade of the first plurality of blades is moved into the raised position and moving the distal end towards the retainer when each blade of the second plurality of blades is moved into the lowered position.

13. Apparatus for automatically folding an air bag having an end coupled to a retainer and an opposed distal end, said apparatus comprising:

elongated pleat holding arms positioned to fit within horizontal pleats in the bag extending from the distal end of the bag substantially to the retainer and to hold the distal end of the bag for limited sliding movement in a horizontal direction to allow the distal end to gradually move toward the retainer as undulating folds are formed in the bag;

a first plurality of upright blades individually movable between a normal lowered position and a raised position and a second plurality of upright blades spaced vertically above the first plurality and individually movable between a normal raised position and a lowered position, the first plurality and the second plurality being further positioned with the blades interdigitated in the raised and lowered positions, respectively;

a clamp positioned to receive the retainer therein with the bag positioned between the first and second pluralities of blades while holding the bag adjacent the distal end; and actuating means for moving each blade of the first plurality of blades into the raised position and alternately and individually moving each blade of the second plurality of blades into the lowered position to form undulating folds in the bag while the distal end of the bag gradually moves toward the retainer as each undulating fold is formed.

14. Apparatus as claimed in claim 13 wherein the actuating means is further constructed to sequentially move each individual blade of the second plurality of blades which was previously moved to the lowered position back into the raised position so that no less than two blades of the second plurality of blades are in the lowered position at a time.

15. Apparatus as claimed in claim 14 including in addition a pair of compression arms positioned to grip the undulating folds therebetween to prevent unfolding thereof.

16. Apparatus as claimed in claim 15 wherein the actuating means is further constructed to move a final two blades of the second plurality of blades into the raised position prior to the pair of compression arms gripping the undulating folds therebetween.

17. Apparatus as claimed in claim 16 wherein the pair of compression arms are further constructed to compress the undulating folds therebetween and the actuating means is further constructed to move the first plurality of blades into the lowered position prior to the pair of compression arms compressing the undulating folds therebetween.

18. Apparatus as claimed in claim 13 wherein the actuating means is also attached to the elongated pleat holding arms to move the distal end of the bag toward the retainer when each blade of the first plurality of blades is moved into the raised position and move the distal end of the bag towards the retainer when each blade of the second plurality of blades is moved into the lowered position.

* * * * *